(12) United States Patent
Ohshima

(10) Patent No.: US 8,359,294 B2
(45) Date of Patent: Jan. 22, 2013

(54) INCORRECT HYPERLINK DETECTING APPARATUS AND METHOD

(75) Inventor: Noriko Ohshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 11/623,135

(22) Filed: Jan. 15, 2007

(65) Prior Publication Data

US 2008/0172220 A1 Jul. 17, 2008

(30) Foreign Application Priority Data

Jan. 13, 2006 (JP) ................. 2006-006720

(51) Int. Cl.
*G06F 7/00* (2006.01)
*G06F 17/00* (2006.01)
(52) U.S. Cl. ............ 707/690; 707/687; 715/234
(58) Field of Classification Search .......... 707/687, 707/690; 715/234
See application file for complete search history.

(56) References Cited

U.S. PATENT DOCUMENTS

| | | | | |
|---|---|---|---|---|
| 6,374,209 | B1 * | 4/2002 | Yoshimi et al. | 704/9 |
| 6,519,557 | B1 * | 2/2003 | Emens et al. | 704/8 |
| 6,601,066 | B1 * | 7/2003 | Davis-Hall | 707/5 |
| 7,464,326 | B2 * | 12/2008 | Kawai et al. | 715/205 |
| 2003/0033333 | A1 * | 2/2003 | Nishino et al. | 707/531 |
| 2004/0133560 | A1 * | 7/2004 | Simske | 707/3 |

FOREIGN PATENT DOCUMENTS

| | | |
|---|---|---|
| JP | 2004-013904 | 1/2004 |
| JP | 2004-139304 | 5/2004 |
| JP | 2004-220193 | 8/2004 |
| JP | 2005-173671 | 6/2005 |
| JP | 2005-346598 | 12/2005 |

OTHER PUBLICATIONS

"Generating and Maintaining Hyperlinks for Documents", Kazuo Ishida and Shunji Ichiyama, IPSJ SIG Notes vol. 99, No. 25, Information Processing Society of Japan, Mar. 12, 1999.

* cited by examiner

*Primary Examiner* — Rehana Perveen
*Assistant Examiner* — Huen Wong
(74) *Attorney, Agent, or Firm* — Steven E. Bach

(57) ABSTRACT

An incorrect hyperlink detecting apparatus which can detect a semantic inconsistency of a hyperlink with high accuracy is provided. An incorrect hyperlink detecting apparatus 10 includes a link source text extracting unit 12 for extracting a text from an HTML file 26 of a link source, a link destination text extracting unit 14 for extracting a text from the HTML file 26 of a link destination, a morpheme analysis unit 16 for dissolving the extracted texts into words, a weighting unit 18 for assigning a weightier every part of speech, a consistency rate calculating unit 20 for calculating a rate that the words of the link source are included in the words of the link destination as a consistency rate from the link source to the link destination and a rate that the words of the link destination are included in the words of the link source as a consistency rate from the link destination to the link source, degree of association calculating unit 22 for calculating a degree of association which indicates a probability of the hyperlink in response to both of the consistency rates, and a CSV output unit 24 for outputting the consistency rate and the degree of association in a CSV form.

11 Claims, 7 Drawing Sheets

INCORRECT HYPERLINK DETECTING APPARATUS AND METHOD

BACKGROUND OF THE INVENTION

The present invention relates to an incorrect hyperlink detecting apparatus and a method of the same, and relates more particularly to an incorrect hyperlink detecting apparatus for detecting a semantic inconsistency of a hyperlink provided to an HTML (Hyper Text Markup Language) file, and a method of the same.

A hyperlink (Hereinafter, referred simply to as "link.") is provided among a large number of documents described in an HTML form (Hereinafter, referred also to as "HTML file.") in WWW (World Wide Web), in order to provide the link, a file name or an anchor name of a link destination (URL: Uniform Resource Locator) is embedded in a document of a link source. When the link is provided correctly, a web browser will access an HTML file of the link destination in response to a click operation to the link text to thereby display the document.

When the link is provided incorrectly, however, an error will be displayed, or a completely unrelated document will be displayed. The former is called a "logical inconsistency", and occurs when a file name or an anchor name, which is not present from the beginning, or was originally present but disappeared afterward, is embedded. Meanwhile, the latter is called a "semantic inconsistency", and occurs when a file name, which is actually present but semantically incorrect, is embedded. Tools which can automatically detect the logical inconsistency of the link have been commonly widely provided, but tools which can automatically detect the semantic inconsistency of the link have not been provided yet. The following ideas, however, have already been proposed.

Japanese Unexamined Patent Publication (Kokai) No. 2004-220193 (Patent Document 1 below) discloses an HTML link examination system, which can examine whether or not an actual HTML site satisfies a site configuration with a link of an HTML file, intended by an implementer of the HTML site, and easily verify whether or not a link from an object that is particularly provided for the movement from one URL to another URL is correctly provided (refer to [Object] in [Abstract]). This system includes site configuration management means for managing in advance the relation through the link among the HTML files in the web, regarding the website which is composed of a plurality of HTML files created with the hypertext language; image link management means for managing related information on the HTML files of the link source and the link destination, regarding the link provided by a predetermined object utilized in the website; link information extracting means for extracting link information in the HTML; and link examination means for examining whether or not a link provided by an image meets the configuration managed by the site configuration management means (refer to [Solution] in [Abstract]).

In this system, however, in order to examine the link, the site configuration with the link of the HTML file which is intended by the implementer of the HTML site must be registered in advance.

Additionally, Japanese Unexamined Patent Publication (Kokai) No. 2004-139304 (Patent Document 2 below) discloses a hypertext test apparatus, which is applied to a hypertext database, and automatically finds and corrects a logically inconsistent (corresponding to the "semantic inconsistency" as used in the present invention) link portion and a correction candidate for it (refer to [Object] in [Abstract]). Information collecting means collects information on a page and a link which configure a hypertext, from the hypertext database to then store it in an information storage unit. Condition determining means groups pieces of link information for every item with reference to the information storage unit, and extracts a unique link out of the group as a link inconsistency. Candidate calculating means calculates a correction candidate which makes the link information of the unique link extracted by the condition determining means to be the same link information as that of the group. Correction reflecting means updates the hypertext database on the basis of the portion of the link inconsistency detected by the condition determining means and the correction candidate calculated by the candidate calculating means (refer to [Solution] in [Abstract]). Condition determining means extracts, from the information storage unit, a link in which a word included in a link source description is not included in a title, a header, and a highlighted character string in a link destination document, and gives a mismatch score thereto (refer to paragraph [0095]). In addition, the condition determining means divides the link source description of the link stored in the information storage unit into words. As how to divide the link source description into words, there are methods of using a morpheme analysis, dividing it where a character type changes, dividing if for every n-characters, or the like (refer to paragraph [0134]).

This apparatus checks only in one direction from the link source to the link destination, and judges it incorrect only when a word included in the link source description is not included in a link destination description. For that reason, for example, when the link source description is "People Finder portrait configuration", and the link destination description is "People/finder configuration mode", it cannot judge to be incorrect. It is because the word of "configuration" included in the link source description is included also in the link destination description. Moreover, although this apparatus is applicable to a massive target with a many-to-many link relation, it is inapplicable to a small-scale target with only a one-to-one link relation, as it is impossible to group pieces of information on the link source or the link destination.

Moreover, Japanese Unexamined Patent Publication (Kokai) No. 2005-173671 (Patent Document 3 below) discloses a link diagnostic system, which automatically detects the logical inconsistency (corresponding to the "semantic inconsistency" as used in the present invention) of the link of the hypertext (refer to [Object] in [Abstract]). The link feature extracting means extracts, as link feature information indicating likeness of logical (semantic) inconsistency of the link, (A) link feature information that can be obtained by the link itself, (B) link feature information that can be obtained on the basis of a relation between the link, and document data of the link destination, or (C) link feature information that can be obtained when the links are grouped according to a predetermined condition, inconsistency learning means seeks for a discriminant function by statistically calculating a relation between a content of each of link feature information and a rate of links judged to be inconsistent, inconsistency determination means determines whether or not the link of a determination target is inconsistent, using link feature information of an undetermined link, and the discriminant function calculated by the inconsistency learning means (refer to [Solution] in [Abstract]). This apparatus also has a problem similar to that of the aforementioned hypertext test apparatus.

Patent Document 1

Japanese Unexamined Patent Publication (Kokai) No. 2004-220193

Patent Document 2

Japanese Unexamined Patent Publication (Kokai) No. 2004-139304

Patent Document 3

Japanese Unexamined Patent Publication (Kokai) No. 2005-173671

SUMMARY OF THE INVENTION

An incorrect hyperlink detecting apparatus according to the present invention includes a first extracting means, a second extracting means, morpheme analysis means, consistency rate calculating means, and degree of association calculating means. The first extracting means extracts a text out of an HTML file of a hyperlink source. The second extracting means extracts a text out of an HTML file of a hyperlink destination. The morpheme analysis means dissolves the texts extracted by the first and second extracting means into one or more words, respectively. The consistency rate calculating means calculates a rate that the words of the hyperlink source are included in the words of the hyperlink destination as a first consistency rate, and a rate that the words of the hyperlink destination are included in the words of the hyperlink source as a second consistency rate, with reference to the words acquisition by the morpheme analysis means. The degree of association calculating means calculates a degree of association indicating a probability of the hyperlink in response to the first and second consistency rates calculated by the consistency rate calculating means.

According to this incorrect hyperlink detecting apparatus, the semantic inconsistency of the hyperlink can be detected with high accuracy, since the check is performed not only in one direction from the hyperlink source to the hyperlink destination, but also in the reverse direction from the hyperlink destination to the hyperlink source.

Preferably, the incorrect hyperlink detecting apparatus further includes weighting means for assigning a weight for every part of speech to calculate the first and the second consistency rates by the consistency rate calculating means.

In this case, detection accuracy for the incorrect hyperlink is increased.

An incorrect hyperlink detecting method according to the present invention is a method of operating the above-mentioned apparatus. An incorrect hyperlink detecting program product according to the present invention is one for causing a computer to function as each of the above-mentioned means. The above-mentioned apparatus is produced by installing the above-mentioned program product in the computer. The above-mentioned method is carried out by using the above-mentioned apparatus. The above-mentioned program product is used for production of the above-mentioned apparatus, and use of the above-mentioned method.

DESCRIPTION OF THE PREFERRED EMBODIMENTS

Figure 1:
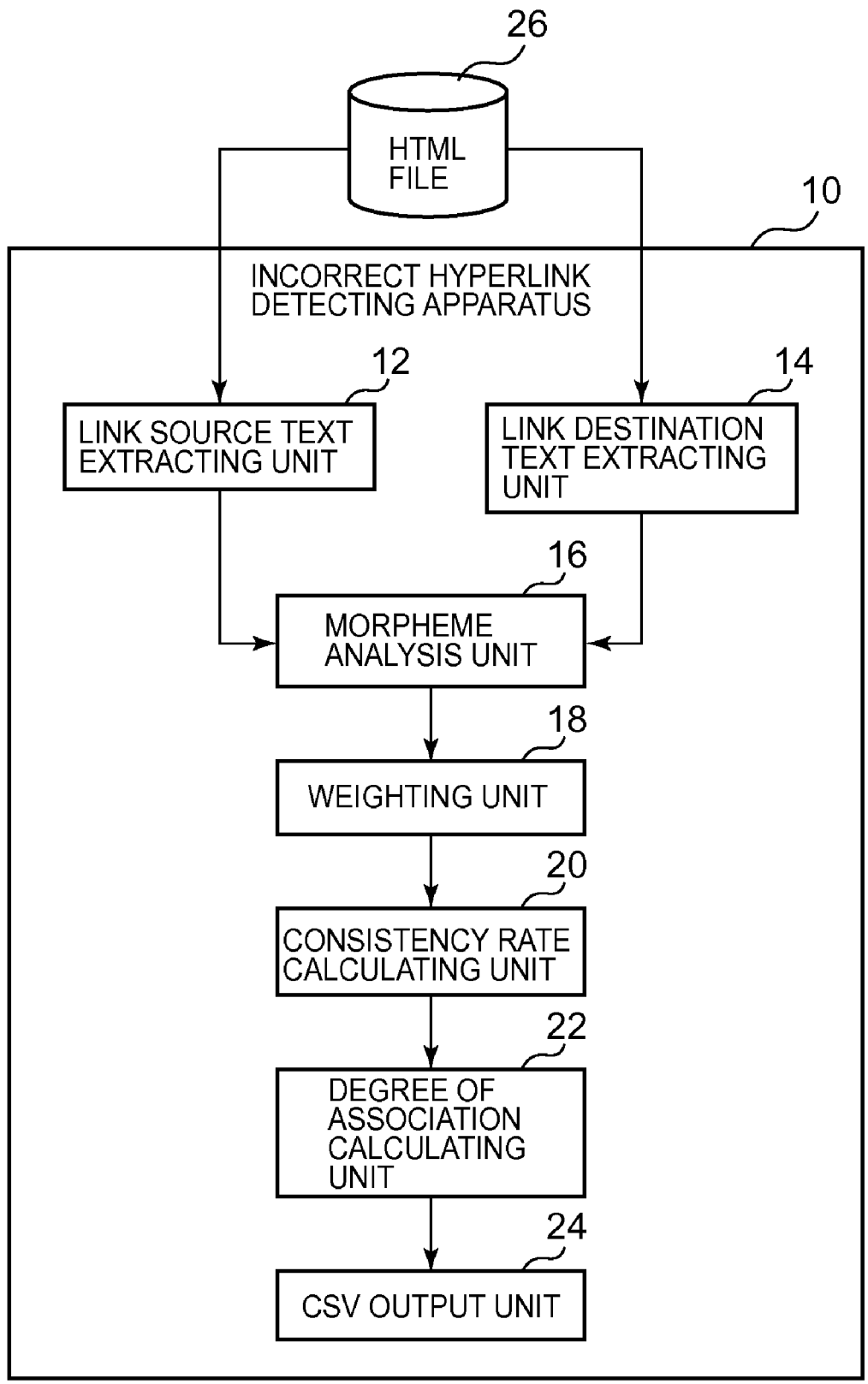
FIG. 1 is a functional block diagram illustrating a hardware configuration of an incorrect hyperlink detecting apparatus according to an embodiment of the present invention.

Hereafter embodiments of the present invention will be described in detail, referring to the drawings. The same reference numerals are given to the same or corresponding parts throughout the drawings, and the description thereof will not be repeated.

Referring to FIG. 1, an incorrect hyperlink detecting apparatus 10 according to the embodiment of the present invention includes a link source text extracting unit 12, a link destination text extracting unit 14, a morpheme analysis unit 18, a weighting unit 18, a consistency rate calculating unit 20, a degree of association calculating unit 22, and a CSV (Comma Separated Values) output unit 24.

The link source text extracting unit 12 extracts a text out of an HTML file 26 of a link source. The link destination text extracting unit 14 extracts a text out of the HTML file 26 of a link destination. The morpheme analysis unit 16 dissolves the texts extracted by the link source text extracting unit 12 and the link destination text extracting unit 14 into one or more words, respectively. The weighting unit 18 assigns a weight for every part of speech to calculate a consistency rate by the consistency rate calculating unit 20. The consistency rate calculating unit 20 calculates a rate that the words of the link source are included in the words of the link destination as a consistency rate from the link source to the link destination, and a rate that the words of the link destination are included in the words of the link source as a consistency rate from the link destination to the link source, with reference to the words obtained by the morpheme analysis unit 16. The degree of association calculating unit 22 calculates a degree of association indicating a probability of the link in response to the consistency rate calculated by the consistency rate calculating unit 20. The CSV output unit 24 outputs the consistency rate calculated by the consistency rate calculating unit 20, and the degree of association calculated by the degree of association calculating unit 22 in a CSV form.

The link source text extracting unit 12, the link destination text extracting unit 14, the morpheme analysis unit 18, the weighting unit 18, the consistency rate calculating unit 20, the degree of association calculating unit 22, and the CSV output unit 24 are achieved by hardware resources (CPU (Central Processing Unit), semiconductor memory, hard disk, keyboard, mouse, display, or the like) of a computer (WWW server or the like). The HTML file 26 is stored in a storage medium (hard disk or the like) of the same computer as this, or storage media of other computers connected thereto via the internet or intranet.

Next the operation of the incorrect hyperlink detecting apparatus 10 will be described.

Figure 2:
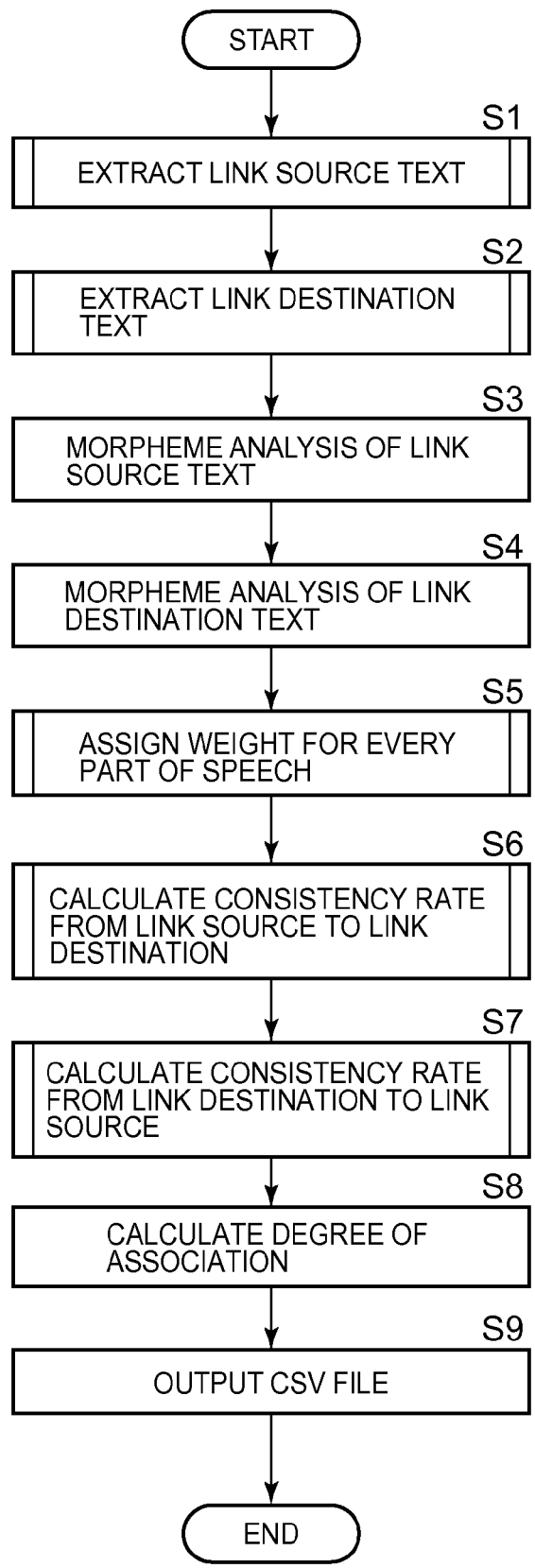
FIG. 2 is a flow chart illustrating an operation method (an execution procedure of an incorrect hyperlink detecting program) of the incorrect hyperlink detecting apparatus illustrated in FIG. 1.
Figure 3:
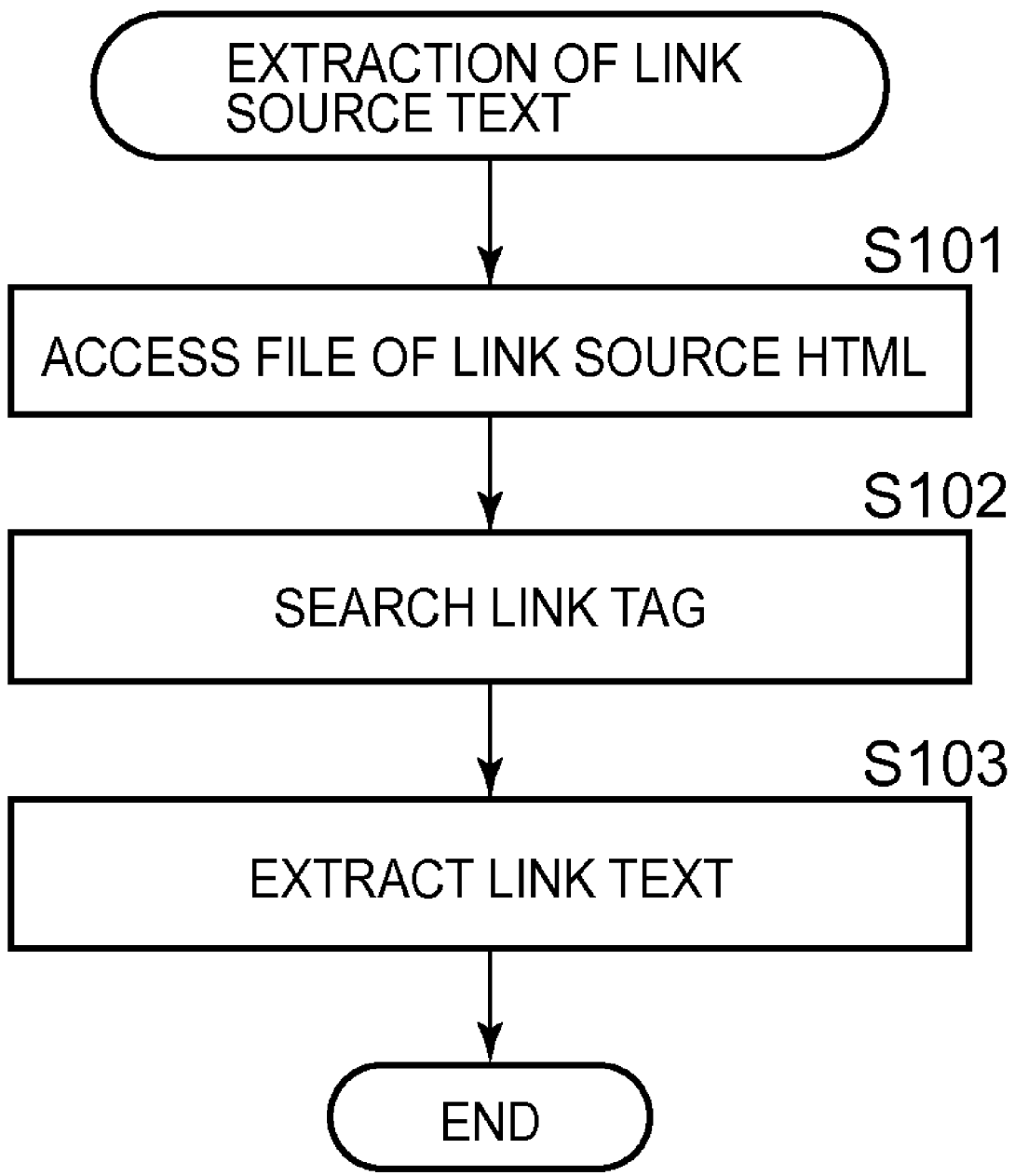
FIG. 3 is a flow chart illustrating the details (subroutine) of the link source text extracting processing in FIG. 2.

Referring to FIG. 2, the link source text extracting unit 12 extracts the text out of the HTML file 26 as a target of detection of the semantic inconsistency of the link (S1). Specifically, referring to FIG. 3, the link source text extracting unit 12 accesses the HTML file 26 of the link source (S101), and searches the HTML file 26 to find out a link tag (for example, </A> for specifying a <A HREF="file001.html"> link) (S102). A file name of the link destination (in this exam pie, "file001.html") or a URL is described in an HREF attribute (HREF=" "), and a link text (in this example, "specify a link") is described between <A HREF=" "> and </A>. The web browser displays the link text and accesses the HTML file of the link destination in response to a click operation to the link text. The link source text extracting unit 12 extracts the found-out link text between the link tags <A HREF=" "> and </A> (S103).

Figure 4:
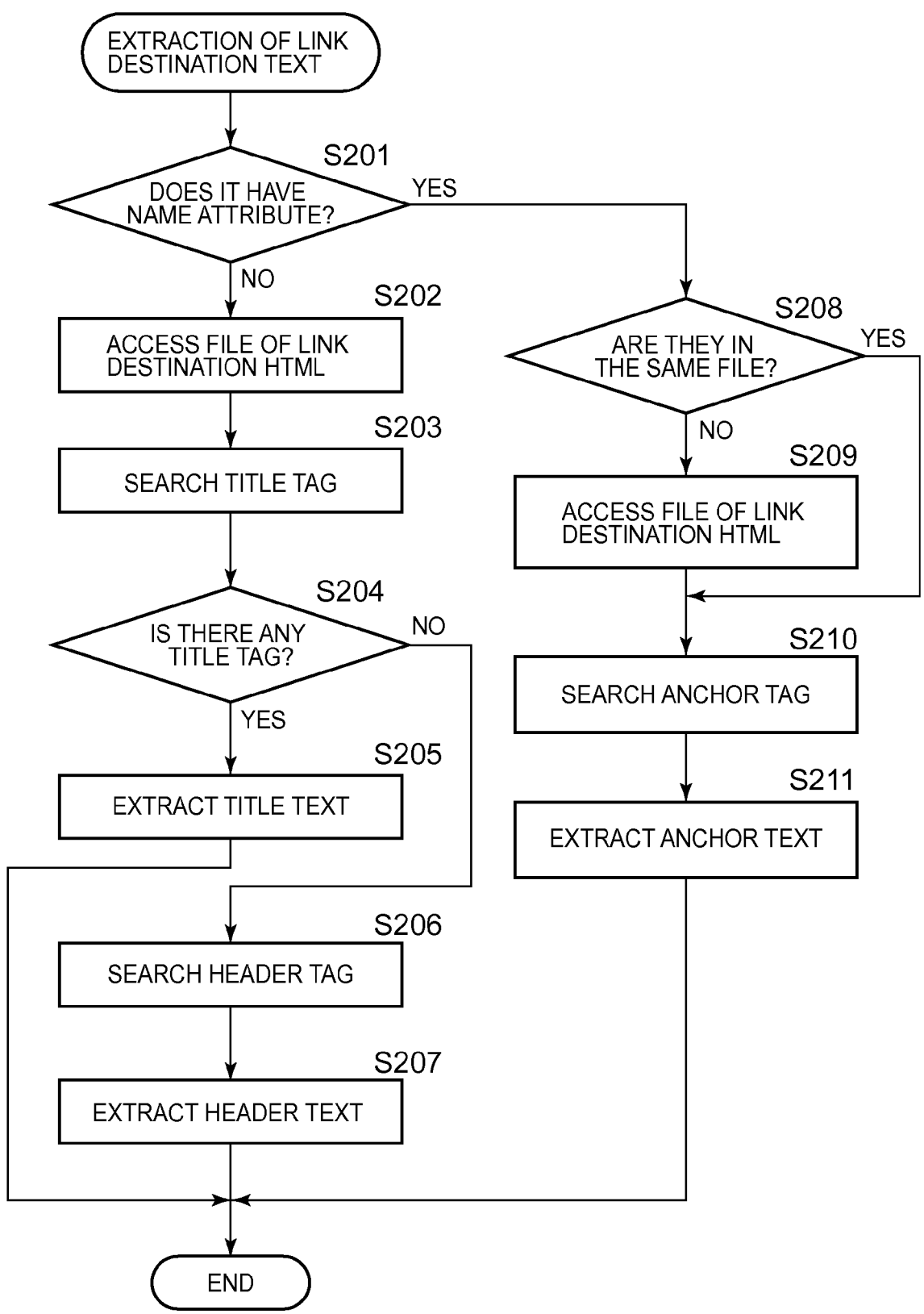
FIG. 4 is a flow chart illustrating the details (subroutine) of the link destination text extracting processing in FIG. 2.

Referring to FIG. 2 again, the link destination text extracting unit 14 extracts the text out of the HTML file 26 of the link destination (S2). Specifically, referring to FIG. 4, the link destination text extracting unit 14 discriminates whether or not the link tag found out by the link source text extracting unit 12 has a NAME attribute (S201), if the link tag has the NAME attribute, this link specifies a specified position in the HTML file 26 of the link destination. In this case, an anchor name (keyword) (in this exam pie, "anchor001") is embedded after "#" like, for example, <A HREF="file001.html#anchor001">, and the same anchor name is embedded in the specified position in the HTML file 26 of the link destination, like <A NAME="anchor001">. Meanwhile, if this link specifies the specified position in the same HTML file 26 (the same page) as that of the link source, the file name in front of "#" will be omitted, like, for example, <A HREF="#anchor001">.

If the link tag does not have the NAME attribute (NO at S201), the link destination text extracting unit 14 accesses the HTML file 28 of the link destination (S202), and searches the HTML file 26 to find out </TITLE> for specifying a title tag <TITLE> link (S203). A title text (in this example, "specification of link") is described between <TITLE> and </TITLE>. The web browser displays the title text on a title bar.

If there is the title tag (YES at S204), the link destination text extracting unit 14 extracts the found-out title text between title tag <TITLE> and </TITLE> (S205). Meanwhile, if there is no title tag (NO at S204), the link destination text extracting unit 14 searches the HTML file 26 of the link destination to find out an explanation </HEAD> of a method of specifying a header tag <HEAD> link (S206). The header text (in this example, "explanation of method of specifying link") is described between <HEAD> and </HEAD>. The web browser displays no header text (except for the title text). The link destination text extracting unit 14 extracts the header text between the found-out header tags <HEAD> and </HEAD> (S207).

Meanwhile, if the link tag has the NAME attribute (YES at S201), the link destination text extracting unit 14 discriminates whether or not this link specifies the specified position in the HTML file 26 the same as that of the link source, namely whether or not the file name in front of "#" is omitted (S208). If this link specifies the specified position in the HTML file 26 different from that of the link source (NO at S208), the link destination text extracting unit 14 accesses the HTML file 26 of the link destination (S209). Meanwhile, if this link specifies the specified position in the HTML file 26 the same as that of the link source (YES at S208), the link destination text extracting unit 14 skips step S209 to proceed to the following step S210.

The link destination text extracting unit 14 searches the HTML file 26 the same as or different from that of the link destination to find out </A> for specifying an anchor tag <A NAME="anchor001"> link (S210). An anchor text (in this example, "specification of link") is described between <A NAME=" "> and </A>. The link destination text extracting unit 14 extracts the found-out anchor text between the anchor tags <A NAME=" "> and </A> (S211).

Meanwhile, if there is no anchor text, header tags or highlighted tags nearest to the anchor tag within predetermined bytes (for example, 150 bytes) before and behind the anchor tag may be found out to thereby extract the text between the tags, if there are no such tags, either, the search may be stopped, as the detection of the incorrect link is impossible.

Referring to FIG. 2 again, the morpheme analysis unit 18 dissolves the text of the link source extracted by the link source text extracting unit 12 (S3) into one or more words, and also dissolved the text of the link destination extracted by the link destination text extracting unit 14 into one or more words (S4). In Japanese, parts of speech are classified into ten kinds, i.e., verb, adjective, adjective verb, noun, adverb, attribute, conjunction, exclamation, auxiliary verb, and particle, and the morpheme analysis unit 16 here classifies verbs into SA line irregular conjugation verb and other verbs.

Figure 5:
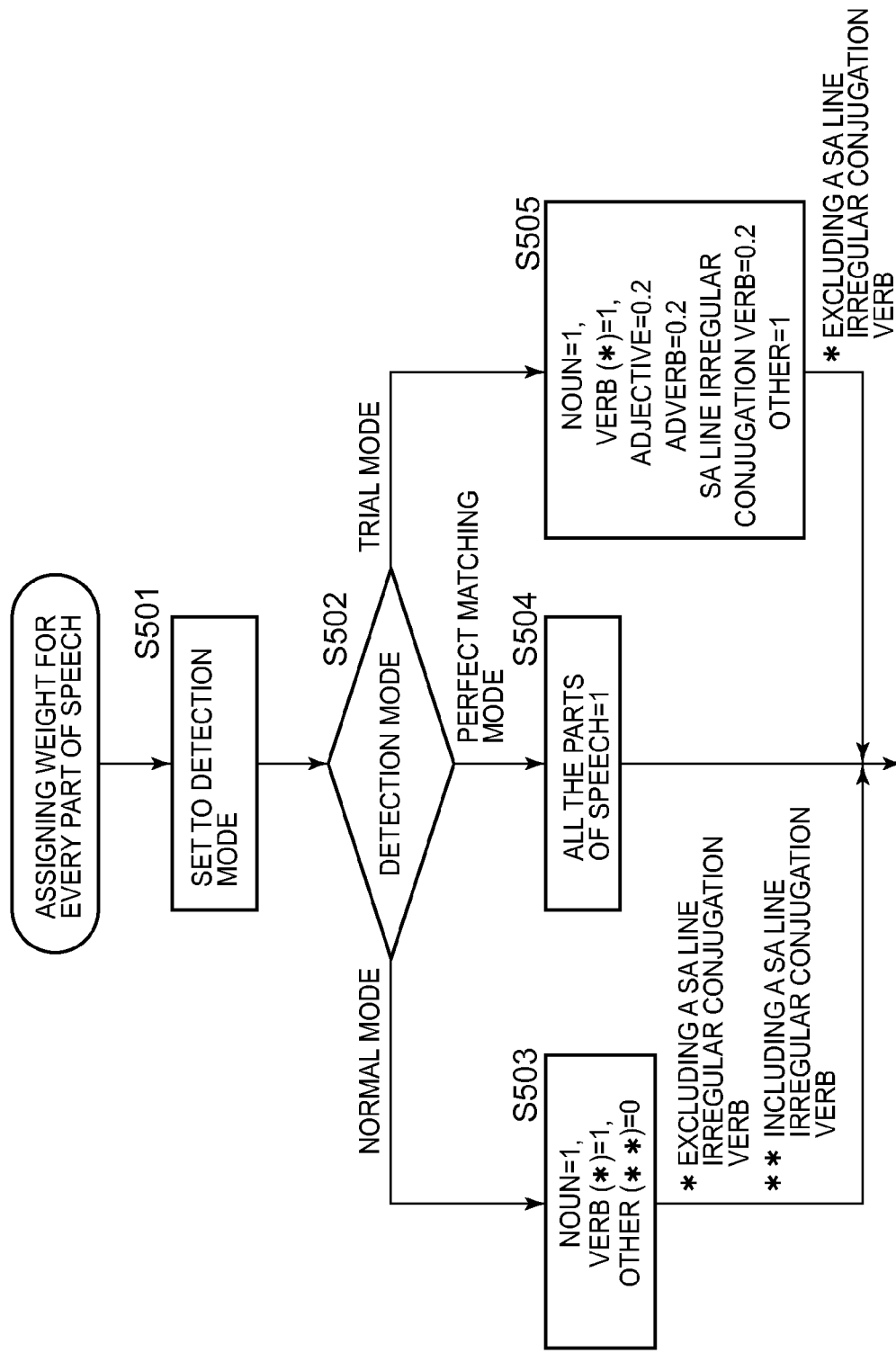
FIG. 5 is a flow chart illustrating the details (subroutine) of the weighting processing in FIG. 2.

Then, the weighting unit 18 sets a desired weighting factor for every part of speech (S5). Specifically, referring to FIG. 5, the weighting unit 18 sets a detection mode in response to a user's selective operation (S501). Herein, three kinds of detection modes, namely, (A) normal mode, (B) perfect matching mode, and (C) trial mode, are prepared. The weighting unit 18 discriminates a set detection mode (S502), and sets the weighting factor according to the detection mode as follows.

(A) Normal Mode

The normal mode is effective to a case where it is desirable to detect serious semantic inconsistency only, as the volume of the target to be checked is large, and there is no time to check finely. In this mode, points are assigned only to the noun and the verb serving as cases of contents. However, points are not assigned to the SA line irregular conjugation verb which does not affect the case of the contents. For that reason, the weighting unit 18 sets points such that the weighting factor of noun=1, the weighting factor of verb other than SA line irregular conjugation verb=1, and the weighting factor of other parts of speech=0 (S503).

(B) Perfect Matching Mode

The perfect matching mode is effective to a case where it is desirable to detect the semantic inconsistency in a site configured so that the text of the link source and the text of the link destination may be perfectly matched with each other, in this mode, it is supposed that the semantic inconsistency occurs if the texts are not perfectly matched with each other, so the same points are assigned to ail the parts of speech. For that reason, the weighting unit 18 sets points such that the weighting factor of all the parts of speech=1 (S504).

(C) Trial Mode

The trail mode is effective to a case where a configuration of a target to be checked is unknown, so that it is desirable to detect the semantic inconsistency including possible semantic inconsistency as many as possible. In this mode, higher points are assigned to the noun and the verb (except for the SA line irregular conjugation verb) serving as the case of the contents, while lower points are assigned to the adjective, the adverb, and the SA line irregular conjugation verb, which do not serve as cases of the contents but indicate the contents. For that reason, the weighting unit 18 sets points such that the weighting factor of noun=1, the weighting factor of verbs other than SA line irregular conjugation verbal, a weighting factor of adjective=0.2, a weighting factor of adverb=0.2, the weighting factor of SA line irregular conjugation verb=0.2, and the weighting factor of other parts of speech=0 (S505).

Referring to FIG. 2 again, the consistency rate calculating unit 20 calculates the rate that the words of the link source obtained by the morpheme analysis unit 18 are included in the words of the link destination obtained by the morpheme analysis unit 16 as the consistency rate from the link source to the link destination (S6).

Figure 6:
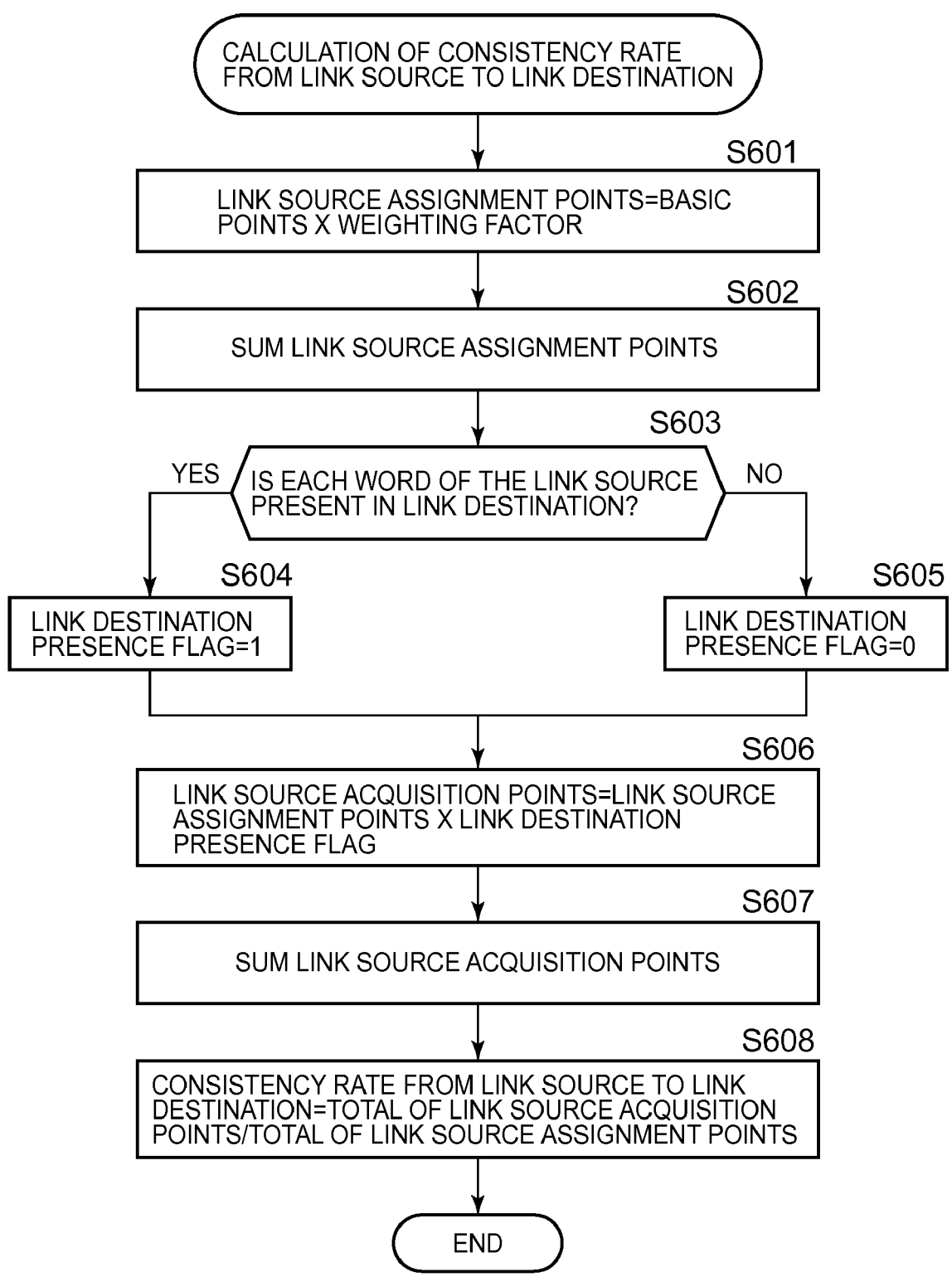
FIG. 6 is a flow chart illustrating the details (subroutine) of the consistency rate calculation processing from a link source to a link destination in FIG. 2.

Specifically, referring to FIG. 6, the consistency rate calculating unit 20 calculates assignment points of each word which is present in the link source by multiplying predetermined basic points by the weighting factor set by the weighting unit 18 (S601), and sums the assignment points (S602).

Subsequently, the consistency rate calculating unit 20 discriminates whether or not each word which is present in the link source is also present in the link destination (S603). If the word which is present in the link source is also present in the link destination (YES at S603), it sets a link destination presence flag=1 (S604), whereas if the word which is present in the link source is not present in the link destination (NO at S603). It sets the link destination presence flag=0 (S605).

Subsequently, the consistency rate calculating unit 20 calculates acquisition points of each word which is present in the link source by multiplying the assignment points of each word which is present in the link source by the corresponding link destination presence flag (S606), and sums the acquisition points (S607).

Then, the consistency rate from the link source to the link destination is calculated, by dividing the total acquisition points of the words which are present in the link source by the total assignment points of the words which are present in the link source (S608).

Referring to FIG. 2 again, the consistency rate calculating unit 20 calculates, in a direction reverse to the above, the rate that the words of the link destination obtained by the morpheme analysis unit 16 is included in the words of the link source obtained by the morpheme analysis unit 16 as the consistency rate from the link destination to the link source (S7).

Figure 7:
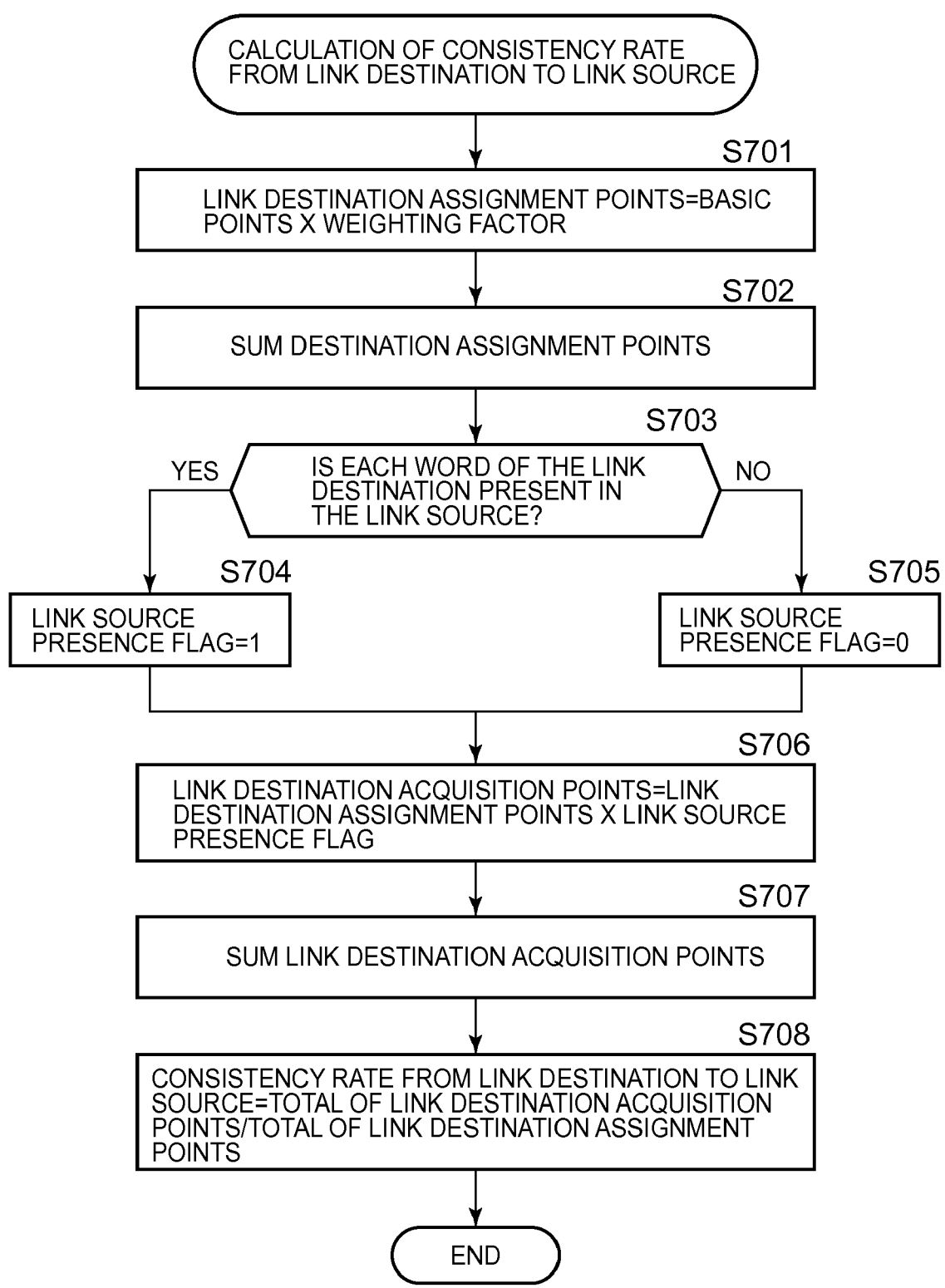
FIG. 7 is a flow chart illustrating the details (subroutine) of the consistency rate calculation processing from the link destination to the link source in FIG. 2.

Specifically, referring to FIG. 7, the consistency rate calculating unit 20 calculates the assignment points of each word which is present in the link destination by multiplying the predetermined basic points by the weighting factor set by the weighting unit 18 (S701), and sums the assignment points (S702).

Subsequently, the consistency rate calculating unit 20 discriminates whether or not each word which is present in the link destination is also present in the link source (S703), if the word which is present in the link destination is also present in the link source (YES at S703), it sets to a link source presence flag=1 (S704), whereas if the word which is present in the link destination is not present in the link source (NO at S703), it sets to the link source presence flag=0 (S705).

Subsequently, the consistency rate calculating unit 20 calculates acquisition points of each word which is present in the link destination by multiplying the assignment points of each word which is present in the link destination by the corresponding link source presence flag (S706), and sums the acquisition points (S707).

Then, the consistency rate from the link destination to the link source is calculated, by dividing the total acquisition points of the words which are present in the link destination by the total assignment points of the words which are present in the link source, (S708).

Now, examples of calculation of the consistency rate are shown in Tables 1 through 6, where the text extracted from the link source is "PERFORM SEARCH FOR OBTAINING CORRECT RESULT (CORRECT RESULT WO OBTAINING FOR NI SEARCH PERFORM in Japanese)", and the text extracted from the link destination is "SEARCH FOR OBTAINING CORRECT RESULT (CORRECT RESULT WO OBTAINING FOR NO SEARCH in Japanese)" In this example, both of the basic points are set to 10.

Table 1 shows the example of calculation of the consistency rate from the link source to the link destination in the normal mode.

TABLE 1

| morphological analysis result | extract | result | "wo" | obtaining | for | "no" | search | total | consistency rate |
|---|---|---|---|---|---|---|---|---|---|
| part of speech | adjective | noun | post-positional particle | verb (*) | post-positional particle | post-positional particle | noun | — | — |
| basic points | 10 | 10 | 10 | 10 | 10 | 10 | 10 | — | — |
| weighting factor | 0 | 1 | 0 | 1 | 0 | 0 | 1 | — | — |
| assignment points | 0 | 10 | 0 | 10 | 0 | 0 | 10 | 30 | — |
| link source presence flag | 1 | 1 | 1 | 1 | 1 | 0 | 1 | — | — |
| acquisition points | 0 | 10 | 10 | 10 | 0 | 0 | 10 | 30 | 100% |

(*) Excluding SA line irregular conjugation verb

Table 2 shows the example of calculation of the consistency rate from the link destination to the link source in the normal mode.

TABLE 2

| morphological analysis result | extract | result | "wo" | obtaining | for | "no" | search | total | consistency rate |
|---|---|---|---|---|---|---|---|---|---|
| part of speech | adjective | noun | post-positional particle | verb (*) | post-positional particle | post-positional particle | noun | — | — |
| basic points | 10 | 10 | 10 | 10 | 10 | 10 | 10 | — | — |
| weighting factor | 0 | 1 | 0 | 1 | 0 | 0 | 1 | — | — |

TABLE 2-continued

| | | | | | | | | | |
|---|---|---|---|---|---|---|---|---|---|
| assignment points | 0 | 10 | 0 | 10 | 0 | 0 | 10 | 30 | — |
| link source presence flag | 1 | 1 | 1 | 1 | 1 | 0 | 1 | — | — |
| acquisition points | 0 | 10 | 10 | 10 | 0 | 0 | 10 | 30 | 100% |

(*) Excluding SA line irregular conjugation verb

Table 3 shows the example of calculation of the consistency rate from the link source to the link destination in the perfect matching mode.

TABLE 3

| morphological analysis result | extract | result | "wo" | obtaining | for | "no" | search | ("area") perform | total | consistency rate |
|---|---|---|---|---|---|---|---|---|---|---|
| part of speech | adjective | noun | post-positional particle | verb (*) | post-positional particle | post-positional particle | noun | (***) | — | — |
| basic points | 10 | 10 | 10 | 10 | 10 | 10 | 10 | 10 | — | — |
| weighting factor | 1 | 1 | 1 | 1 | 1 | 1 | 1 | 1 | — | — |
| assignment points | 10 | 10 | 10 | 10 | 10 | 10 | 10 | 10 | 80 | — |
| link source presence flag | 1 | 1 | 1 | 1 | 1 | 0 | 1 | 0 | — | — |
| acquisition points | 10 | 10 | 10 | 10 | 10 | 0 | 10 | 0 | 60 | 95% |

(*) Excluding SA line irregular conjugation verb
(***) SA line irregular conjugative verb Table 4 shows the example of calculating the consistency rate from the link destination to the link source in the perfect matching mode.

TABLE 4

| morphological analysis result | extract | result | "wo" | obtaining | for | "no" | search | total | consistency rate |
|---|---|---|---|---|---|---|---|---|---|
| part of speech | adjective | noun | post-positional particle | verb (*) | post-positional particle | post-positional particle | noun | — | — |
| basic points | 10 | 10 | 10 | 10 | 10 | 10 | 10 | — | — |
| weighting factor | 1 | 1 | 1 | 1 | 1 | 1 | 1 | — | — |
| assignment points | 0 | 10 | 10 | 10 | 10 | 10 | 10 | 70 | — |
| link source presence flag | 1 | 1 | 1 | 1 | 1 | 0 | 1 | — | — |
| acquisition points | 10 | 10 | 10 | 10 | 10 | 0 | 10 | 60 | 86% |

(*) Excluding SA line irregular conjugation verb

Table 5 shows the example of calculating the consistency rate from the link source to the link destination in the trial mode.

TABLE 5

| morphological analysis result | extract | result | "wo" | obtaining | for | "no" | search | perform ("area") | total | consistency rate |
|---|---|---|---|---|---|---|---|---|---|---|
| part of speech | adjective | noun | post-positional particle | verb (*) | post-positional particle | post-positional particle | noun | (***) | — | — |
| basic points | 10 | 10 | 10 | 10 | 10 | 10 | 10 | 10 | — | — |
| weighting factor | 0.2 | 1 | 0.1 | 1 | 0.1 | 0.1 | 1 | 0.2 | — | — |
| assignment points | 2 | 10 | 1 | 10 | 1 | 1 | 10 | 2 | 32 | — |

TABLE 5-continued

| | | | | | | | | | | |
|---|---|---|---|---|---|---|---|---|---|---|
| link source presence flag | 1 | 1 | 1 | 1 | 1 | 0 | 1 | 0 | — | — |
| acquisition points | 2 | 10 | 1 | 10 | 1 | 0 | 10 | 0 | 42 | 92% |

(*) Excluding SA line irregular conjugation verb
(***) SA line irregular conjugative verb Table 6 shows the example of calculating the consistency rate from the link destination to the link source in the trial mode.

TABLE 6

| morphological analysis | extract | result | "wo" | obtaining | for | "no" | search | total | consistency rate |
|---|---|---|---|---|---|---|---|---|---|
| result part of speech | adjective | noun | post-positional particle | verb (*) | post-positional particle | post-positional particle | noun | — | — |
| basic points | 10 | 10 | 10 | 10 | 10 | 10 | 10 | — | — |
| weighting factor | 0.2 | 1 | 0.1 | 1 | 0.1 | 0.1 | 1 | — | — |
| assignment points | 2 | 10 | 1 | 10 | 1 | 1 | 10 | 35 | — |
| link source presence flag | 1 | 1 | 1 | 1 | 1 | 0 | 1 | — | — |
| acquisition points | 2 | 10 | 1 | 10 | 1 | 0 | 10 | 34 | 97% |

(*) Excluding SA line irregular conjugation verb

Referring to FIG. 2 again, the degree of association calculating unit 22 calculates the degree of association indicating a probability of the link in response to the consistency rates in both directions calculated by the consistency rate calculating unit 20 (S8). The degree of association may be an index for indicating a possibility that the link is provided correctly, and the calculation method is not limited in particular, but what is necessary is just to calculate values representing both, such as an arithmetic mean or a geometric mean of the consistency rate calculated in both directions. Additionally, a total of six consistency rates are calculated by calculating the consistency rates in both directions in the above-mentioned three kinds of detection modes, and the relation between the consistency rate and the degree of association may be defined in advance such that the degree of association is 100% if all six consistency rates are 100%, it is 90% if only five consistency rates are 100%, it is 80% if only four consistency rates are 100%, it is 70% if only three consistency rates are 100%, it is 60% if only two consistency rates are 100%, it is 50% if only one consistency rate is 100%, it is 0% if all six consistency rates are 0%, and it is 10% other than those.

Subsequently, the CSV output unit 24 outputs the consistency rate calculated by the consistency rate calculating unit 20, and the degree of association calculated by the degree of association calculating unit 22 in a CSV form (S9).

As described above, according to the incorrect hyperlink detecting apparatus 10 in accordance with the embodiment of the present invention, the semantic inconsistency of the link can be detected with high accuracy. Moreover, since the weight is assigned for every part of speech, the detection accuracy is further increased, since the check is performed not only in one direction from the link source to the link destination, but also in the reverse direction from the link destination to the link source.

Additionally, since three kinds of detection modes are prepared, the semantic inconsistency of the link can be appropriately detected in accordance with the characteristics of the detected target, such as placing emphasis on the defection accuracy, placing emphasis on the time required for the detection, or the like.

Moreover, since not all the text of the link destination are extracted, but only the title text or the like which characterizes the document of the link destination is extracted, the time required for the detection processing can be reduced.

Although the title text, the header text, the anchor text, the caption text, the highlighted text, and the like are extracted from the link destination in the above-mentioned embodiment, these are only exemplifications, so that what is necessary is to extract the text that characterizes the document of the link destination.

Additionally, while there are three detection modes in the above-mentioned embodiment, the number and content of modes are not limited thereto in particular. For example, by setting only the weighting factor of noun to 1, and setting the weighting factors of other parts of speech to 0, only a noun may be targeted to be checked. Moreover, the present invention may also be applicable to languages other than Japanese.

As described above, although the embodiments of the invention have been described, the aforementioned embodiments are only exemplifications for carrying out the present invention. Therefore, the present invention is not limited to the embodiments described above, and accordingly, all suitable modifications of the aforementioned embodiments and equivalents may be resorted to, falling within the scope of the subject of the present invention.

The invention claimed is:

1. An incorrect hyperlink detecting apparatus for detecting a logical inconsistency of a hyperlink, comprising:
   a first extracting means for extracting a text out of an HTML file of a hyperlink source;
   a second extracting means for extracting a text out of an HTML file of a hyperlink destination;
   morpheme analysis means for dissolving the texts extracted by the first and second extracting means into one or more words, respectively;
   consistency rate calculating means for calculating a rate that the words of the hyperlink source are included in the words of the hyperlink destination as a first consistency rate, and a rate that the words of the hyperlink destination are included in the words of the hyperlink source as a second consistency rate, with reference to the words obtained by the morpheme analysis means;

degree of association calculating means for calculating a degree of association indicating a probability of a correct hyperlink based on the first and second consistency rates calculated by the consistency rate calculating means; and weighting factor setting means for setting a desired weighting factor for a part of speech;

wherein the consistency rate calculating means includes:
means for calculating assignment points of the words of the hyperlink source by multiplying predetermined basic points by the weighting factor set by the weighting factor setting means;

means for calculating assignment points of the words of the hyperlink destination by multiplying predetermined basic points by the weighting factor set by the weighting factor setting means;

means for setting a link destination presence flag to 1 if the words of the hyperlink source is present in the hyperlink destination, and setting the link destination presence flag to 0 if the words of the hyperlink source is not present in the hyperlink destination;

means for setting the link source presence flag to 1, if the words of the hyperlink destination is present in the hyperlink source, and setting the link source presence flag to 0 if the words of the hyperlink destination is not present in the hyperlink source;

means for calculating acquisition points of the words of the hyperlink source by multiplying the calculated assignment points of the words of the hyperlink source by the set link destination presence flag;

means for calculating acquisition points of the words of the hyperlink destination by multiplying the calculated assignment points of the words of the hyperlink destination by the set link source presence flag;

means for calculating the first consistency rate by dividing a total of the calculated acquisition points of the words of the hyperlink source by a total of the calculated assignment points of the words of the hyperlink source; and means for calculating the second consistency rate by dividing a total of the calculated acquisition points of the words of the hyperlink destination by a total of the calculated assignment points of the words of the hyperlink destination.

2. The incorrect hyperlink detecting apparatus according to claim 1, wherein the weighting factor setting means sets the weighting factors of a noun and a verb, except for a SA line irregular conjugation verb, to a value larger than 0, and sets the weighting factors of other parts of speech to 0.

3. The incorrect hyperlink detecting apparatus according to claim 1, wherein the weighting factor setting means sets the weighting factors of a noun and a verb, except for a SA line irregular conjugation verb, to a first value larger than 0, sets the weighting factors of an adjective, an adverb, and a SA line irregular conjugation verb to a second value smaller than the first value and larger than 0, and sets the weighting factors of other parts of speech to 0.

4. The incorrect hyperlink detecting apparatus according to claim 1, wherein the first extracting means includes:
means for searching the HTML file of the hyperlink source to find out a link tag; and
means for extracting a link text between found-out link tags.

5. The incorrect hyperlink detecting apparatus according to claim 1, wherein the second extracting means includes:
means for searching the HTML file of the hyperlink destination to find out a title tag; and
means for extracting a title text between the found-out title tags.

6. The incorrect hyperlink detecting apparatus according to claim 5, wherein the second extracting means further includes:
means for searching the HTML file of the hyperlink destination to find out a header tag if there is no title tag; and
means for extracting a header text between the found-out header tags.

7. The incorrect hyperlink detecting apparatus according to claim 5, wherein the second extracting means further includes means for extracting an anchor text between anchor tags embedded in the specified position when the hyperlink specifies a specified position in the HTML file.

8. An incorrect hyperlink detecting method of detecting a logical inconsistency of a hyperlink, comprising the steps of:
extracting a text out of an HTML file of a hyperlink source;
extracting a text out of an HTML file of a hyperlink destination;
dissolving the extracted texts into one or more words with a morpheme analysis, respectively;
calculating a rate that the words of the hyperlink source are included in the words of the hyperlink destination as a first consistency rate, and a rate that the words of the hyperlink destination are included in the words of the hyperlink source as a second consistency rate, with reference to the words obtained by the morpheme analysis means; and
calculating a degree of association indicating a probability of a correct hyperlink based on the first and second consistency rates; and
further comprising the step of setting a desired weighting factor for a part of speech;
wherein the step of calculating rates includes:
calculating assignment points of the words of the hyperlink source by multiplying predetermined basic points by the weighting factor for the part of speech;
calculating assignment points of the words of the hyperlink destination by multiplying predetermined basic points by the weighting factor for the part of speech;
setting a link destination presence flag to 1 if the words of the hyperlink source is present in the hyperlink destination, and setting the link destination presence flag to 0 if the words of the hyperlink source is not present in the hyperlink destination;
setting the link source presence flag to 1, if the words of the hyperlink destination is present in the hyperlink source, and setting the link source presence flag to 0 if the words of the hyperlink destination is not present in the hyperlink source;
calculating acquisition points of the words of the hyperlink source by multiplying the calculated assignment points of the words of the hyperlink source by the set link destination presence flag;
calculating acquisition points of the words of the hyperlink destination by multiplying the calculated assignment points of the words of the hyperlink destination by the set link source presence flag;
calculating the first consistency rate by dividing a total of the calculated acquisition points of the words of the hyperlink source by a total of the calculated assignment points of the words of the hyperlink source; and calculating the second consistency rate by dividing a total of the calculated acquisition points of the words of the hyperlink destination by a total of the calculated assignment points of the words of the hyperlink destination.

9. The incorrect hyperlink detecting method according to claim 8, further comprising the step of assigning a weight for every part of speech in order to calculate the first and the second consistency rates.

10. A computer program product for detecting a logical inconsistency of a hyperlink, comprising a computer readable storage device having encoded thereon:

program instructions for extracting a text out of an HTML file of a hyperlink source;

program instructions for extracting a text out of an HTML file of a hyperlink destination;

program instructions for dissolving the extracted texts into one or more words with a morpheme analysis;

program instructions for setting a desired weighting factor for a part of speech;

program instructions for calculating a rate that the words of the hyperlink source are included in the words of the hyperlink destination as a first consistency rate, and a rate that the words of the hyperlink destination are included in the words of the hyperlink source as a second consistency rate—with reference to the words obtained by the morpheme analysis means; and program instructions for calculating a degree of association for indicating a probability of a correct hyperlink based on the first and second consistency rates;

wherein the program instructions for calculating rates includes:

program instructions for calculating assignment points of the words of the hyperlink source by multiplying predetermined basic points by the weighting factor for the part of speech;

program instructions for calculating assignment points of the words of the hyperlink destination by multiplying predetermined basic points by the weighting factor for the part of speech;

program instructions for setting a link destination presence flag to 1 if the words of the hyperlink source is present in the hyperlink destination, and setting the link destination presence flag to 0 if the words of the hyperlink source is not present in the hyperlink destination;

program instructions for setting the link source presence flag to 1, if the words of the hyperlink destination is present in the hyperlink source, and setting the link source presence flag to 0 if the words of the hyperlink destination is not present in the hyperlink source;

program instructions for calculating acquisition points of the words of the hyperlink source by multiplying the calculated assignment points of the words of the hyperlink source by the set link destination presence flag;

program instructions for calculating acquisition points of the words of the hyperlink destination by multiplying the calculated assignment points of the words of the hyperlink destination by the set link source presence flag;

program instructions for calculating the first consistency rate by dividing a total of the calculated acquisition points of the words of the hyperlink source by a total of the calculated assignment points of the words of the hyperlink source; and program instructions for calculating the second consistency rate by dividing a total of the calculated acquisition points of the words of the hyperlink destination by a total of the calculated assignment points of the words of the hyperlink destination.

11. The incorrect hyperlink detecting program product according to claim 10, further causing the computer to execute the step of assigning a weight for every part of speech in order to calculate the first and the second consistency rates.

\* \* \* \* \*